Patented Feb. 7, 1950

2,496,343

UNITED STATES PATENT OFFICE 2,496,343

RED-IRON OXIDE TYPE FLUID CATALYST FOR HYDROCARBON SYNTHESIS

Bruce G. Gillespie, Union, N. J., assignor to Standard Oil Development Company, a corporation of Delaware No Drawing. Application June 4, 1946, Serial No. 674,371

4 Claims. (Cl. 260—449.6)

This invention relates to catalytic conversions and improved catalysts therefor. More specifically the invention is concerned with improved iron catalysts for fluid catalyst operation, particularly for the catalytic synthesis of normally liquid hydrocarbons and/or oxygenated compounds from CO and $H_2$.

Iron type catalysts are normally employed in the hydrocarbon synthesis at relatively high temperatures of about 450°–800° F. and relatively high pressures of about 3–100 atm. abs. or higher, to obtain predominantly unsaturated and oxygenated products from which motor fuels with high octane ratings may be recovered.

The extreme temperature sensitivity and relatively rapid catalyst deactivation of the hydrocarbon synthesis have led in recent years to various attempts and proposals to employ the so-called fluid catalyst technique wherein the synthesis gas is contacted with a dense turbulent bed of finely divided catalyst fluidized by the gaseous reactants and products and which permits continuous catalyst replacement and greatly improved temperature control. However, the adaptation of the hydrocarbon synthesis to the fluid catalyst technique has encountered serious difficulties, particularly when iron catalysts are used.

Application of the fluid catalyst technique requires in addition to the conventional characteristics determining catalyst utility, such as total desired yield, and active catalyst life, ease of fluidization and attrition resistance. None of the prior art iron catalysts complies satisfactorily with all of these requirements.

Iron catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals, and others, in small amounts of about 1–10%. While some of these catalysts exhibit excellent activity characteristics they are without exception deficient with respect to ease of fluidization and attrition resistance for the following reasons.

Catalysts obtained by the reduction of natural iron oxides, such as various oxidic iron ores, may be ground to a fluidizable particle size, however not without excessive losses in the form of fines having particle sizes below the minimum fluidizable size of about 30 microns. In addition, the particles of proper fluidizable size are extremely brittle and subject to excessive attrition in the course of fluid operation.

Iron catalysts prepared by the reduction of synthetic oxides, such as precipitated red or yellow iron oxides or by the decomposition of iron carbonyls, are obtained in the form of extremely fine powders having particle sizes far below the fluidizable range. Attempts to convert these powders into fluidizable materials by agglomerating treatments, such as pilling or sintering, have failed as a result of either the low attrition resistance or the irregularity of the agglomerates.

The present invention overcomes the aforementioned difficulties and affords various additional advantages as will be fully understood from the more detailed description given below.

It is therefore the main object of my invention to provide an improved process for the catalytic conversion of CO and $H_2$.

Another object of my invention is to provide an improved catalyst for the hydrocarbon synthesis and a method of preparing the same.

A more specific object of my invention is to provide an iron catalyst for the hydrocarbon synthesis, which combines high activity and long catalyst life with highest utility for fluid catalyst operation.

A still further object of my invention is to provide an improved hydrocarbon synthesis process operated by the fluid catalyst technique.

Another object of my invention is to provide an iron catalyst having improved utility for fluid catalyst operation.

Other and further objects and advantages will appear hereinafter.

In accordance with the present invention well fluidizable iron catalysts are obtained by subjecting iron oxides to a sintering treatment and grinding the sintered material to a fluidizable particle size. A reducing treatment may be applied, preferably prior to grinding. I have found that the sintering treatment increases the mechanical strength of the catalyst mass so considerably that it may be ground in conventional grinders to a desired particle size within the range of, say, 30 to 250 microns or about 60–400 mesh with a negligible loss in the form of non-fluidizable fines of less than 30 microns or about 400 mesh particle size. In addition, my fluidizable catalyst particles, hardened by sintering, are far superior to fluidizable iron catalyst prepared by conventional methods with respect to attrition resistance and exhibit highest catalytic activity and satisfactory catalyst life.

It is important for the catalytic, mechanical and pseudo-hydrodynamic properties of the catalysts of my invention that the sintering treatment be subsequent to any treatment with liquids or solids, which affects the chemical composition and/or physical structure of the catalyst. When preparing my catalysts, I prefer, therefore, to combine the iron oxide with any addition agents desired, such as activators or the like, by impregnation or mechanical mixing and to subject the resulting composite to sintering followed by grinding to the desired particle size.

While I may use sufficiently pure iron oxides of any origin and particle size as the starting material for my improved iron catalysts, best results are obtained when fine iron oxide powders, particularly the precipitated material known as red iron oxide, are employed which have substantially uniform particle sizes of less than, say, about 50 microns and preferably less than about 30 microns. These iron oxide powders may first be impregnated with suitable solutions of activators or other additives to yield a powdered or lumpy mass which is subjected to sintering to form a hard friable mass which is ground to the desired particle size of say about 30 to 200 microns. A reducing treatment may precede or follow the sintering treatment, but in accordance with the preferred embodiment of my invention the sintering treatment is carried out in a reducing atmosphere, using hydrogen, carbon monoxide, gaseous hydrocarbons, or the like, or mixtures of such reducing gases.

Suitable sintering temperatures fall within the approximate range of 1200°–1600° F. in a reducing atmosphere, but may be considerably higher in a non-reducing atmosphere. For instance in an inert atmosphere of nitrogen or the like it may range anywhere from about 1600° F. to about 2700° F. The sintering treatment should be carried at least to a point at which surface deformation of the sintered particles becomes appreciable. Reduction temperatures ranging from about 800° to about 1500° F. are generally adequate to obtain the desired degree of reduction which may reach the metallic state or any oxygen concentration known to be beneficial for iron catalysts.

A typical method suitable for preparing iron catalysts useful in fluid catalyst operation is illustrated by the following example.

*Example*

Red iron oxide powder having an average particle size of about 10–20 microns is impregnated with a solution of potassium carbonate in distilled water of about 1–1.5 wt. per cent strength until about 1.5% of potassium carbonate based on iron has been incorporated in the iron oxide. The reresulting pasty mass is dried at a temperature of about 150°–300° F. and reduced in a stream of hydrogen at about 900° F. for about 2–6 hours. The lumpy, reduced material is sintered in a hydrogen atmosphere at about 1600° F. for about 4 hours. The resulting hard granular mass is ground by subjecting it to 3 or 4 passes through a conventional laboratory planetary disc grinder. Products having the following typical sieve analyses are obtained:

| Sieve Sizes | | Weight Percent | |
|---|---|---|---|
| Through | On | Sample A | Sample B |
|  | 40 | 1.0 |  |
| 40 | 60 | 1.1 |  |
| 60 | 100 | 7.3 | 13.8 |
| 100 | 140 | 9.1 | 11.5 |
| 140 | 200 | 9.8 | 12.6 |
| 200 | 270 | 22.3 | 8.1 |
| 270 | 325 | 23.9 | 9.1 |
| 325 |  | 25.5 | 44.5 |
| Loss |  | 0.0 | 0.4 |

The above samples contain more than 50% of particles within the size range of 60–325 mesh and fluidize readily, both in nitrogen and synthesis gas mixtures of carbon monoxide and hydrogen. For example, at superficial gas velocities normal for dense phase fluid operation, such as 0.2–0.4 ft. per second, a turbulent fluidized solids bed is formed having a well defined upper level and exhibiting a steady pressure drop over the height of the fluidized mass similar to that of a liquid. Small amounts of entrained solids may be readily separated from the gas by conventional mechanical gas-solids separators. The catalyst retains essentially this condition in normal fluid operation for more than 750 hours.

Catalysts obtained from red iron oxide powder or iron ores by sizing without sintering or by sintering without subsequent grinding on the other hand, when applied at similar conditions of gas flow form either immediately or after about 5–10 hours operation compact catalyst masses through which the gas bubbles without any fluidizing effect entraining usually large proportions of catalyst fines which cannot be separated by gas-solids separators of the type mentioned and require gas filters or similar complicated means of separation.

A catalyst prepared in accordance with the above example was employed in the hydrocarbon synthesis using a synthesis gas containing about 2 mols of $H_2$ per mol of CO and a gas recycle ratio of about 2:1 at a fresh feed gas through-put of about 1,000 volumes of gas per volume of catalyst per hour, a superficial gas velocity of about 0.4 ft. per second, a pressure of about 250 lbs. per sq. in. gage and a reaction temperature of about 600° F. At these conditions about 97% of the CO supplied was converted to form per cubic meter of synthesis gas, about 214 c. c. of $C_4$ and higher hydrocarbons including oxygenated organic compounds recovered from the product water.

The experimental results reported above demonstrate that the catalysts prepared in accordance with the present invention combine perfect ease of fluidization with highest catalytic activity.

While I have described my invention with specific reference to the catalytic synthesis of hydrocarbons it will be readily understood that the invention affords similar advantages in connection with other fluid catalyst operations involving the use of iron type catalysts, for example the hydrogenation of unsaturated hydrocarbons, the synthesis of ammonia, the halogenation of certain hydrocarbons, etc.

The present invention is not to be limited by any theory of the mechanism of the process or catalyst nor to any examples given merely for illustration purposes, but only by the following claims in which I wish to claim all novelty inherent in the invention.

I claim:

1. An improved process for producing valuable conversion products from CO and $H_2$ in the presence of iron catalysts which comprises contacting a gas containing CO and $H_2$ in synthesis proportions at synthesis conditions with a fluidized mass of sintered reduced iron oxide particles of fluidizable size obtained by a method comprising incorporating into red-iron oxide powder a minor promotional amount of potassium carbonate subjecting the composite obtained to a substantially complete reduction including a sintering treatment in a hydrogen-containing reducing atmosphere at about 1600° F. and grinding the sintered product to a fluidizable particle size.

2. The process of claim 1 wherein said composite is subjected to a reducing treatment prior to said sintering treatment.

3. An improved process for producing valuable conversion products from CO and $H_2$ in the presence of iron catalysts which comprises contacting a gas containing CO and H₂ in synthesis proportions at synthesis conditions with a fluidized mass of sintered reduced iron oxide particles of fluidizable size obtained by a method comprising incorporating into red-iron oxide powder a minor promotional amount of potassium carbonate, subjecting the composite obtained to a substantially complete reduction including a sintering treatment in a hydrogen-containing reducing atmosphere at a sintering temperature within the range of from 1200° to about 1600° F. and grinding the sintered product to a fluidizable particle size.

4. The process of claim 3 wherein said composite is subjected to a reducing treatment prior to said sintering treatment.

BRUCE G. GILLESPIE.

REFERENCES CITED

The following references are of record in the file of this patent:

UNITED STATES PATENTS

| Number | Name | Date |
| --- | --- | --- |
| 2,106,597 | Ferguson | Jan. 25, 1938 |
| 2,183,146 | Michael | Dec. 12, 1939 |
| 2,220,261 | Michael et al. | Nov. 5, 1940 |
| 2,306,665 | Schwarzkopf | Dec. 29, 1942 |
| 2,365,094 | Michael et al. | Dec. 12, 1944 |
| 2,393,909 | Johnson | Jan. 29, 1946 |
| 2,414,585 | Eggertsen | Jan. 21, 1947 |
| 2,417,164 | Huber, Jr. | Mar. 11, 1947 |